Oct. 18, 1966   R. A. ENGLANDER ETAL   3,279,580
APPARATUS FOR TRANSPORTING CYLINDRICAL ARTICLES
Filed June 23, 1965                    3 Sheets-Sheet 1
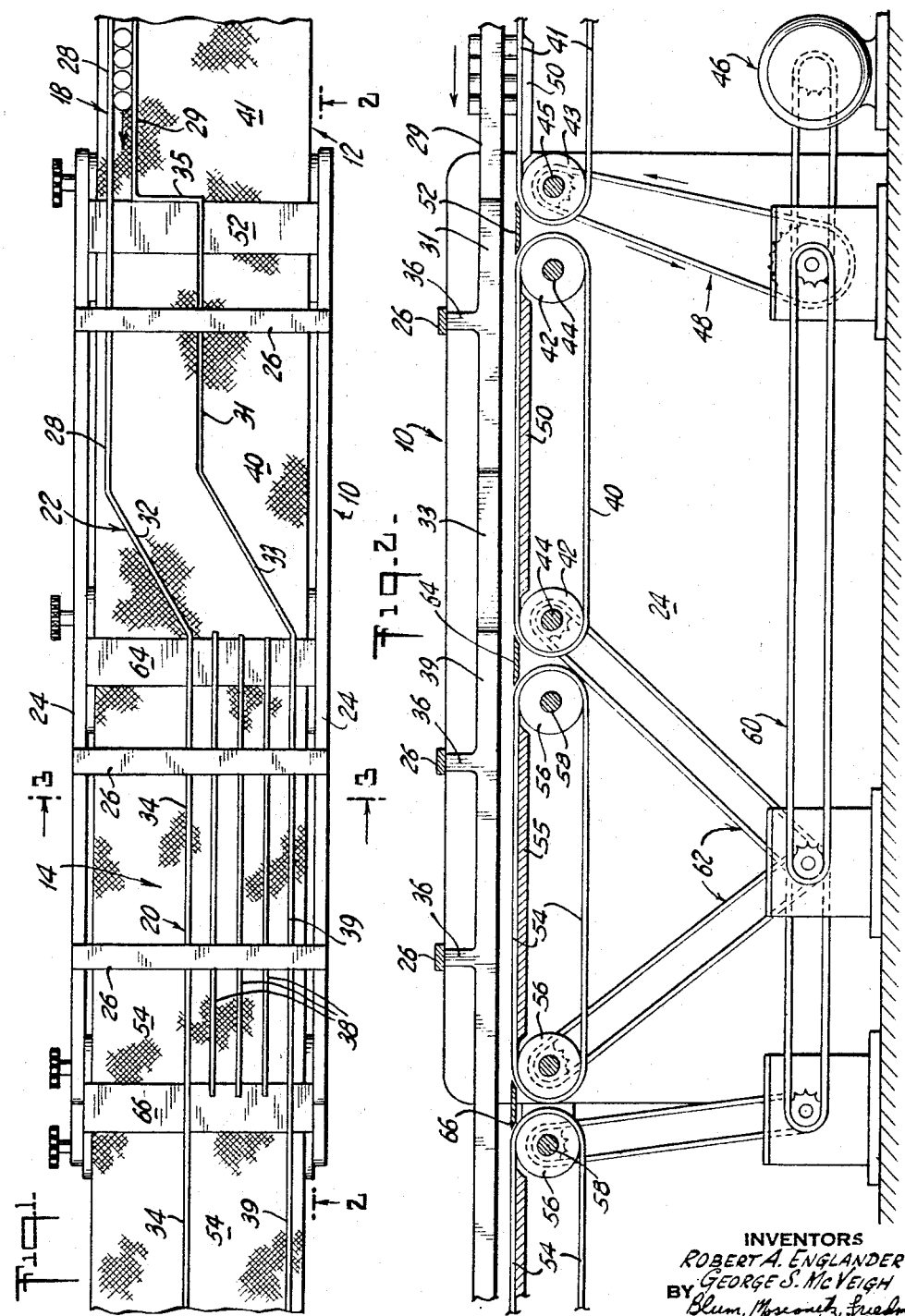

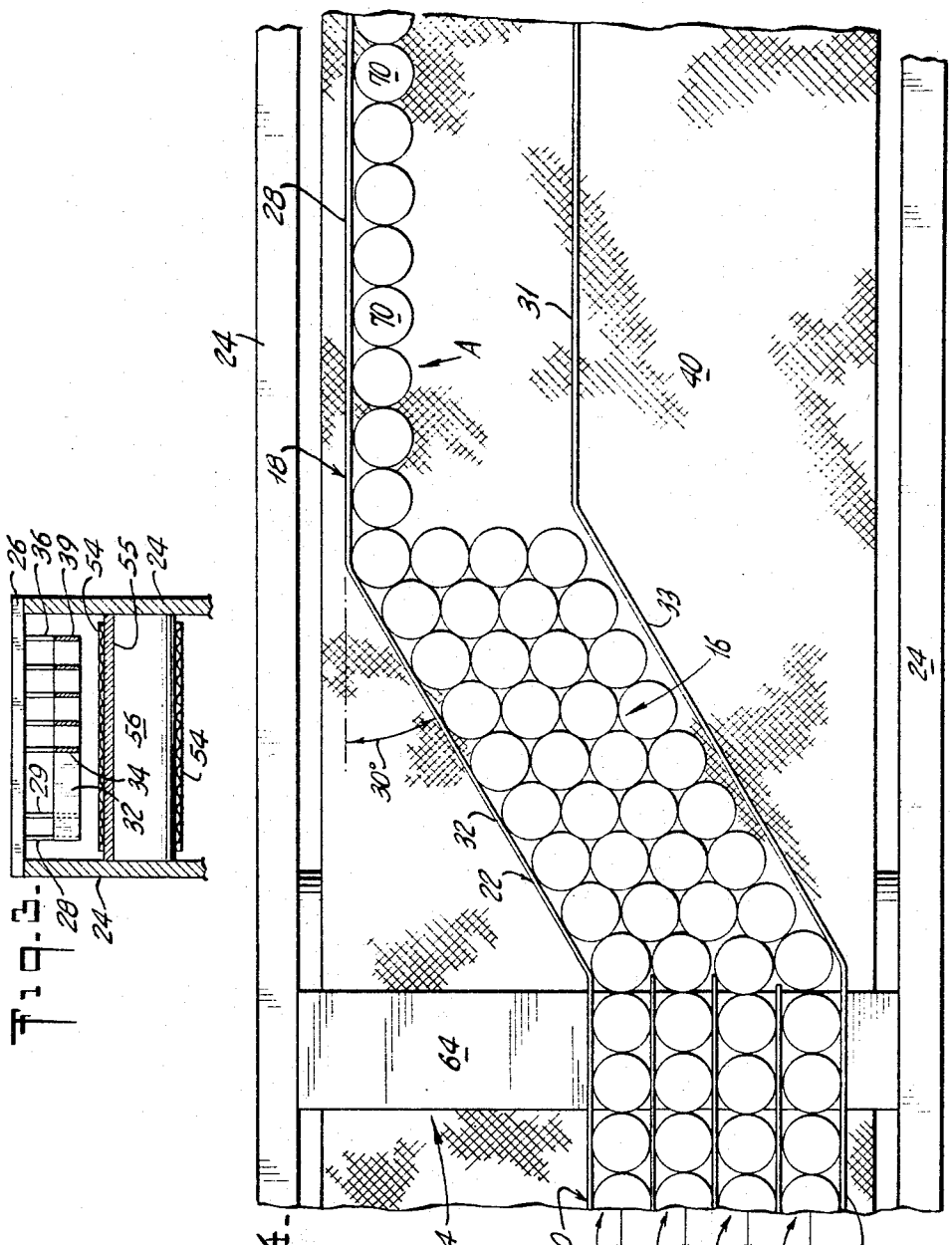

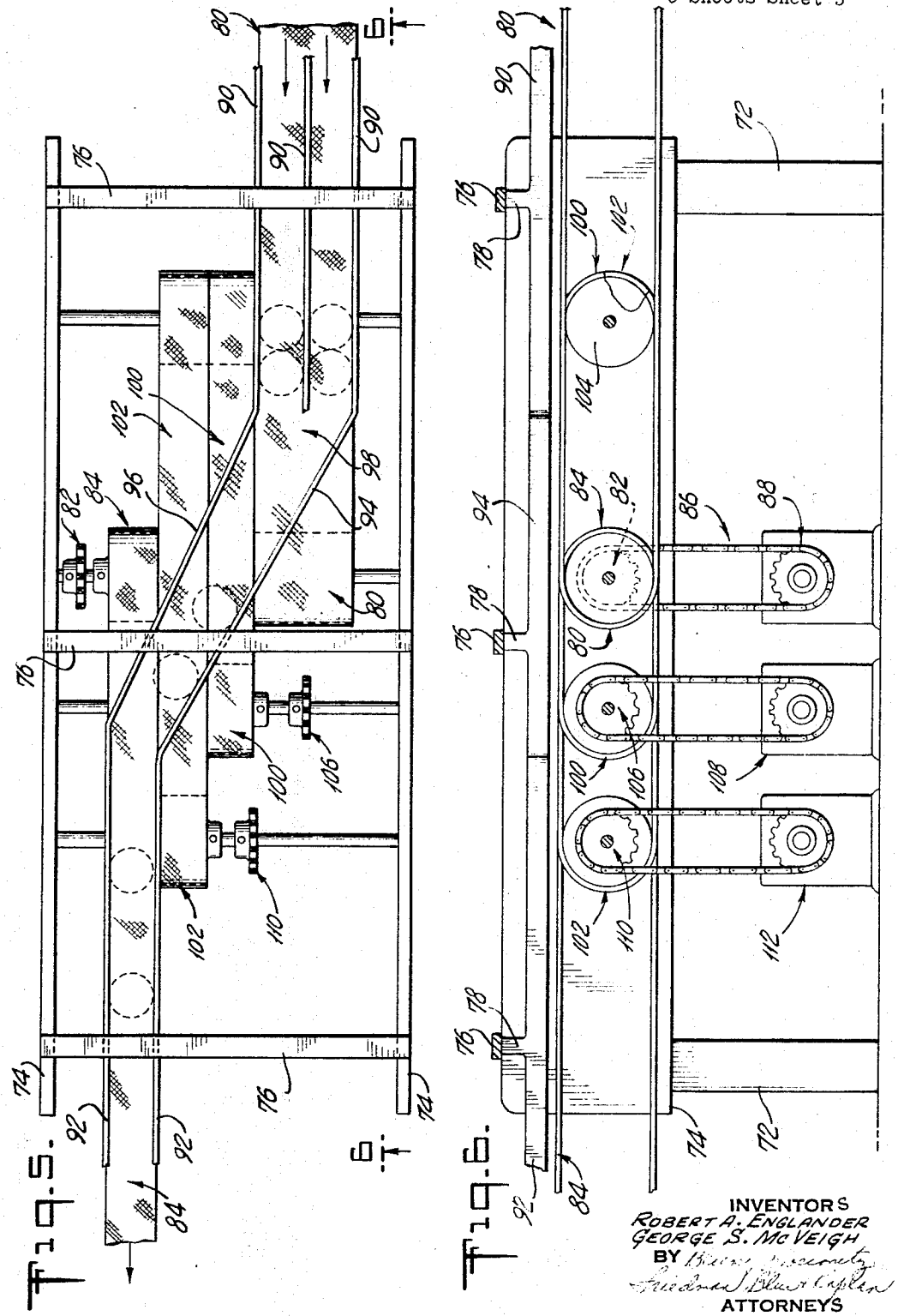

United States Patent Office 3,279,580
Patented Oct. 18, 1966

3,279,580
APPARATUS FOR TRANSPORTING CYLINDRICAL
ARTICLES
Robert A. Englander, 3621 Manton Drive, and George S.
McVeigh, 325 Sumpter St., both of Lynchburg, Va.
Filed June 23, 1965, Ser. No. 466,267
3 Claims. (Cl. 198—32)

This application is a continuation-in-part of our copending application Serial Number 364,910, entitled Apparatus for Transporting Cylindrical Articles, and filed on May 5, 1964.

The present invention relates to an apparatus for transporting cylindrical articles.

In particular, the present invention relates to apparatus for transporting cylindrical articles such as cans which contain edible products, for example.

At the present time the processing of cylindrical articles of this type requires that at a certain stage in the processing the number of rows of cylindrical articles be increased considerably and at high speed for further processing of the cylindrical article such as for packaging.

For example, in the case of cans of beer it is known that such cans are conveyed from a pasteurizer in a single row, for example. However, in order to be transported from such a single row to suitable packaging apparatus, for example, it is necessary to increase the number of rows considerably and at high speed, and at the present time there are serious limitations of the extent to which it is possible to increase the number of rows of cylindrical articles of this type at high speed.

One of the known devices for increasing the number of rows of such articles is a star wheel type of mechanism which operates effectively up to a rate of 600 units per minute, but beyond this speed insurmountable problems are encountered, so that this type of known mechanism is seriously limited.

In order to attempt to increase the speed of the operations it has already been proposed to use magnetic mechanisms where cylindrical articles arranged in a zig-zag pattern are magnetically pulled apart from each other into a pair of rows, so that in this way the number of rows is increased by such a magnetic mechanism, but, of course, this type of construction is seriously limited since the magnets will work effectively on steel cans but are completely ineffective on glass or aluminum cans, and high speed canning operations would involve aluminum cans to a far greater extent were it not for the problem of dividing the cans into a sufficiently greater number of rows in a high speed operation.

Cylindrical article have the inherent property of nesting with respect to each other. Thus, as such articles are conveyed along a given path each cylindrical article tends to engage and become located between an adjacent pair of cylindrical articles so that in this way the cylindrical articles nest within each other preventing the central axes of the articles from remaining in straight rows since the nesting displaces the articles laterally with respect to each other, and it is this nesting property which has rendered mechanical separation of the articles into a plurality of rows difficult to carry out.

It is accordingly one of the primary objects of the present invention to provide a structure which is capable of effectively dividing one or more rows of cylindrical articles into a plurality of rows of cylindrical articles with the number of the latter plurality of rows being greater than the number of rows of the articles before they are divided, to an extent which will greatly increase the speed of operation, as compared to known high speed operating devices of this type, without requiring the use either of star wheel mechanisms or magnetic mechanisms.

A further object of the present invention is to divide a given number of rows of cylindrical articles into a greater number of rows to an extent which has heretofore not been possible with a purely mechanical structure which will operate effectively irrespective of the material of which the articles are made, so that the structure of the invention will work equally well on glass, aluminum, steel, or fiber cans.

Yet another object of the present invention is to provide a structure of the above type which takes advantage of the nesting properties of cylindrical articles to divide a given number of rows thereof into a larger number of rows with a simple structure which will operate very effectively.

The objects of the present invention also include a structure capable of accomplishing the above objects while at the same time being exceedingly simple and rugged so that it is inexpensive to manufacture and maintain.

Primarily the present invention is based on the discovery that if the direction of movement of a row of cylindrical articles is changed by approximately 30° the articles will nest into each other so that they can very conveniently be divided into any desired number of rows but at the same time there will be absolutely no tendency of the articles to jam or in any way to retard their transportation as long as the 30° deflection in the path of movement of the articles is not exceeded by 5° one way or the other.

It is also desirable under certain circumstances to be able to combine a plurality of rows of cylindrical articles into a lesser number of rows, and here again difficulties are encountered with respect to jamming of the articles as the greater number of rows are compressed against each other to form the lesser number of rows.

It is therefore also an object of the present invention to provide a structure capable of efficiently reducing the number of rows of cylindrical articles without any danger of jamming.

Also, the objects of the present invention include a structure for combining a relatively large number of rows into a smaller number of rows of articles in a manner which will efficiently continue the transportation of the articles in a substantially gap-free series in each row.

The invention is illustrated, by way of example, in the accompanying drawings which form part of the application and in which:

FIG. 1 is a top plan view of that part of an article transporting apparatus which includes one possible embodiment of a structure according to the present invention;

FIG. 2 is a partly sectional side elevation of the structure of FIG. 1 taken along line 2—2 of FIG. 1 in the direction of the arrows;

FIG. 3 is a transverse section of the structure of FIG. 1 taken along lines 3—3 of FIG. 1 in the direction of the arrows;

FIG. 4 is a top plan view showing on an enlarged scale, as compared with FIG. 1, that part of the structure of FIG. 1 which includes a row-increasing zone of the invention;

FIG. 5 is a schematic top plan view of another embodiment of a structure according to the present invention, the embodiment of FIG. 5 being used for reducing the number of rows; and FIG. 6 is a schematic side elevation of the structure of FIG. 5.

The article transporting apparatus 10 indicated in FIG. 1 includes an infeed conveyor means 12 and a discharge conveyor means 14. The discharge conveyor means 14 is in line with the infeed conveyor means 12. The infeed conveyor means 12 serves to convey cylindrical articles such as the cans 70, described below in connection with FIG. 4, from the right toward the left, as viewed in FIG. 1, to a predetermined row-increasing zone 16 where the number of rows of cylindrical articles is increased, and the discharge conveyor means 14 receives the articles at the row-increasing zone 16 and discharges the articles away from the row-increasing zone 16.

An infeed guide means 18 is situated over and extends longitudinally of the infeed conveyor means 12 for guiding the cylindrical articles in at least one straight row extending longitudinally of the infeed conveyor means 12 as the articles advance toward the row-increasing zone 16. A discharge guide means 20 is located over and extends longitudinally of the discharge conveyor means 14 for guiding the cylindrical articles in a plurality of rows the number of which is greater than the number of rows provided by the infeed guide means 18, and it will be seen from FIG. 1 that the discharge guide means 20 is laterally offset with respect to the infeed guide means 18. Located at the row-increasing zone 16 is a deflecting means 22 which is operatively connected with the infeed guide means 18 and discharge guide means 20 for deflecting the articles at the row-increasing zone so that their path of movement is changed by approximately 30° as the articles are advanced through the row-increasing zone 16 to the discharge conveyor means 14.

The supporting structure includes a pair of elongated parallel side frame members 24 which are fixed at their upper edges to a plurality of cross bars 26 which extend across the space between and are carried by the side frame members 24.

The infeed guide bar means 18 includes an elongated straight substantially rigid bar 36' fixed in any suitable way to one of the cross bars 26 so that in this way the infeed guide bar 28 is supported over and extends longitudinally of the infeed conveyor means 12. The infeed guide means 18 also includes a second bar 29 parallel to the bar 28 and spaced therefrom by a distance approximately equal to the diameter of the cylindrical articles, and the bar 29 is supported in the same way as bar 28 from cross members 26.

The deflecting means includes an elongated straight bar 32 which is fixed at one end to the infeed guide bar 28, and the deflecting bar 32 defines with the bar 28 an angle of approximately 150°, for a purpose referred to below, and at its end which is distant from the bar 28 the deflecting bar 32 is fixed to an elongated guide bar 34 which forms an end guide bar to the discharge guide means 20. It will be noted that the discharge guide bar 34 is parallel to and laterally offset with respect to the infeed guide bar 28. The bar 34 has a plurality of upwardly directed extensions 36 fixed to the underside of a plurality of cross members 26 so that in this way the bar 34 is supported over and extends longitudinally of the discharge conveyor means 14, and the discharge guide means 20 includes a plurality of additional bars 38, 39 parallel to each other and to the bar 34, spaced from each other by a distance approximately equal to the diameter of the cylindrical articles which are to be conveyed, all of the bars 38 and 39 having upwardly directed extensions 36 fixed to the undersides of the cross bars 26 so as to be supported thereby over the discharge conveyor means 14 extending longitudinally thereof, as shown in FIG. 1. The intermediate discharge guide bars 38 are situated between the end discharge guide bars 34 and 39, and at its end which is adjacent to the row-increasing zone 16 the end discharge guide bar 39 is fixed to an elongated straight bar 33 which extends parallel to the deflecting bar 32 and which is in turn fixed to an elongated guide bar 31 parallel to that part of bar 28 which extends over the row-increasing zone 16 and spaced therefrom by a distance equal to the distance between parallel bars 32 and 33. A transverse bar 35 is fixed to free ends of the bars 29 and 31.

The infeed conveyor means 12 includes one or more endless belts 41 supported for rotary movement by suitable rollers 43 which are in turn fixed on shafts 45 which are carried by any suitable bearings which are in turn supported by the side frame members 24, and some of the shafts 45 extend outwardly beyond one of the side frame members 24 to be connected to suitable transmission elements, such as sprocket wheels, pulleys, or the like, for the purpose of driving the endless belts 41. The endless bands or belts 41 from well known tabletop or flattop conveyor chain assemblies which may be composed of a metal mesh, for example. A suitable source of power 46, shown in the lower right of FIG. 2, in the form, for example, of an electric motor or the like, drives through a suitable transmission 48, composed of belts and pulleys or endless chains and sprocket wheels, the endless conveyors 41 in the manner shown diagrammatically in FIG. 2. The upper runs of the endless conveyors 40 are located directly over flat rigid plate members 50 so that in this way the upper runs are maintained perfectly flat.

Row-increasing zone 16 is formed by an endless conveyor 40 carried by rollers 42 which are fixed to shafts 44 which are supported for rotation by bearings carried by walls 24. The left shaft 44 of FIG. 2 extends out beyond wall 24 and fixedly carries a sprocket wheel so as to be driven by a suitable transmission. A rigid plate 50 also supports the upper run of belt 40, this plate 50 extending between and being fixedly carried by the frame members 24. Endless conveyor 40 forms an intermediate conveyor means situated between infeed conveyor means 12 and discharge conveyor means 14. Between the endless conveyors 40 and 41 is an elongated plate 52 which extends between and is fixedly carried by the side members 23, in the same way that the plate 50 extends between and is fixedly carried by the side frame members 24, so that the conveyed articles will move smoothly from endless conveyor 41 to the endless conveyor 40.

The discharge conveyor means 14 has a construction very similar to that of the infeed conveyor means 12. Thus, the discharge conveyor means 14 includes a plurality of endless conveyors 54 of the same structure as the endless conveyors 40 and 41 and supported by rollers 56 which are in turn fixed on suitable shafts 58 carried by suitable bearings which are supported by the side frame members 24, and in this case also certain ones of the shafts 58 extend outwardly beyond one of the side frame members 24 to carry transmission members in the form of pulleys, sprocket wheels, or the like. As is apparent from FIG. 2, a transmission 60 transmits the drive from the transmission 48 to a further transmission 62 also made up of any suitable combination of belts and pulleys or sprocket wheels and sprocket chains, as shown particularly in FIG. 2. It is to be noted from FIG. 2 that the transmission is such that the endless conveyors 40 and 54 will be driven at a speed less than the speed with which the conveyors 41 are driven and in the instant example a 1:4 ratio is used corresponding to the ratio of rows. Plates 55 identical with plates 50 extend between and are carried by the side frame members 24 and are situated beneath the upper runs of the endless conveyors 54 so as to maintain them perfectly flat. A plate 64 extends between and is carried by the side frame members 24, and this plate 64 provides a smooth transition for the articles from the row-increasing zone 16 to the discharge conveyor means 14, and an additional plate 66 is carried by the side frame members 24 and is situated between the pair of endless conveyors 54 in order to provide a smooth transition therebetween.

The manner in which the structure of the invention operates is best illustrated in FIG. 4. As may be seen from FIG. 4, the conveyor 40 extends beneath the row-increasing zone 16 so that the articles received from the infeed conveyor means 12 at the row-increasing zone 16 are conveyed through the row-increasing zone 16 at the same speed as they are subsequently conveyed by the discharge conveyor means 14. In the illustrated example the articles are in the form of cylindrical cans 70 which may, for example, be beer cans which are delivered by the infeed conveyor means 12 from a pasteurizer to the row-increasing zone 16. In the illustrated example, the infeed guide means 18 provides a single straight row of cans 70 extending longitudinally of the infeed conveyor means 12, but it is to be understood that the invention is equally applicable to a structure which provides, for example, two or more rows of cylindrical articles which are conveyed to the row-increasing zone 16.

At the row-increasing zone 16 the deflecting means 22 deflects the articles 70 so as to change their direction of travel by 30°, as indicated in FIG. 4. As is also illustrated in FIG. 4, the cylindrical articles nest within each other at the row-increasing zone so as to form a group of articles as illustrated in FIG. 4 at the row-increasing zone 16. It is particularly to be noted that although there is an additional elongated bar 33 parallel to the bar 32 and connected between the bars 39 and 31, nevertheless the articles 70 do not engage the bar 33 except at its end portion which is adjacent to the discharge end guide bar 39, so that a considerable portion of the bar 33 may be omitted if desired.

It is to be noted that with the cylindrical articles nested at the row-increasing zone 16 as illustrated in FIG. 4, the central axes of any group of three engaging articles 70 form in a plane normal to these axes an equilateral triangle, and the angle of deflection equals of course one-half of each angle of this triangle. It has been found that by providing a deflection angle of 30° the articles while nesting within each other in the manner shown in FIG. 4 nevertheless have no tendency to jam and move quite smoothly from the infeed guide means 18 to the discharge guide means 20. Increasing or decreasing the angle 30 to a slight extent does not materially change the operation. However, when this angle of 30° is increased in either direction by over 5° it has been found that jamming does indeed occur so that the angle of deflection provided by the deflecting means 22 is ideal precisely at 30° but may range between 25° and 35°, although at the limits of this range of from 25° to 35° there may be such a smooth operation and beyond this range jamming will result.

In the particular example illustrated, a single row A of articles 70 is guided by the infeed guide means 18 to the row-increasing zone 16 where the deflecting means 22 deflects the articles so as to change the direction of movement thereof by approximately 30°, and the single row A is divided in the illustrated example into four rows B, C, D, E. The several parallel guide bars of the discharge guide means 20 guide the articles 70 in these latter four rows, and it is to be noted that the plate 64 is situated at the transition between the row-increasing zone 16 and the discharge conveyor means 14 so that the articles move smoothly from the row-increasing zone 16 to the discharge conveyor means 14. As was indicated above the conveyors 54 and 40 of the discharge conveyor means 14, zone 16 moves at a slower speed than the conveyors 41 of the infeed conveyor means 12, and in the illustrated example the speed of the conveyors 54 and 40 is one-fourth the speed of the conveyors 41. Whatever the number of rows of articles conveyed by the discharge conveyor means 14, the speed of movement thereof will always have with the relation to the speed of movement of the infeed conveyors the same ratio as the number of rows provided by the infeed guide means 18 to the number of rows provided by the discharge guide means 20.

It is thus apparent that with the structure of the invention, primarily as a result of the deflection angle of approximately 30° which is provided by the deflecting means 22, it is possible to convey cylindrical articles in such a manner that advantage is taken of their inherent nesting properties to divide the articles into a relatively large number of rows so that the speed of the operation can be very high, certainly much higher than heretofore possible, without requiring the use of star wheel mechanisms or magnetic mechanisms, and the cylindrical articles will be treated with the structure of the invention in precisely the same way irrespective of the material of which the articles are made, so that with the invention it is possible to handle aluminum cans as well as glass cans or cans made of other fibrous materials, and, of course, steel cans can be handled also without any difficulty, so that the range of materials which can be used for the cans is in no way limited by the structure of the invention, and at the same time a very high output far beyond 600 cans per minute can be achieved with the structure of the invention.

The above results which are achieved by the deflection angle of 30° can also be used very effectively in the case of a reduction of the number of rows, since in this case also it is possible to combine a given number of rows into a lesser number of rows without any possible jamming of the cylindrical articles by use of the deflection angle of 30°, approximately, of the present invention.

Referring to FIG. 6, the structure includes suitable standards 72 which carry side frame members 74 which serve to support for rotation various pulley shafts as well as to carry the transverse members 76 which correspond to the transverse members 26 of FIGS. 1 and 2, these members 76 being fixed with downwardly depending portions 78 which are fixed to the structure for guiding the cylindrical articles, this latter structure being described in detail below.

The structure includes an infeed conveyor means 80 in the form of a suitable endless belt supported at its upper run by the flat horizontal members, in the same way as the above-described conveyors and this infeed conveyor means 80 feeds the cylindrical articles from the left or the right, as viewed in FIGS. 5 and 6. The right end of the conveyor 80 extends about a pulley 82.

The articles are discharged by a discharge conveyor means 84, also in the form of an endless conveyor belt supported and guided in the same way as the above-described belts, and the conveyor 84 is guided around a pulley mounted on the same shaft as that as carries the pulley 82, but the pulley for the belt 84 is freely turnable on this shaft and is not driven with the shaft which serves merely to support the pulley of the belt 82 for rotary movement but otherwise has no influence on this latter pulley. The shaft which carries the pulley 82 is driven by a transmission 86 from a suitable drive 88 which may be a self-contained drive or which may be itself a transmission driven from a suitable source of energy, and it is as a result of this feed of the drive transmitted by the transmission 88 and 86 to the pulley 82 that the speed of the conveyor 80 is determined. In the same way a drive is connected to the right end of the conveyor 84 which is not visible in the drawing to drive the conveyor 84 at a given speed which in the illustrated examples of FIGS. 5 and 6 will of course be greater than the speed of movement of the conveyor 80 inasmuch as the number of rows is decreasing.

In the illustrated example the bars 76 with their downwardly directed portions 78 serve to support guide bars 90 which guide a pair of straight parallel rows of cylindrical articles, such as suitable cans or the like longitudinally along the conveyor 80 for movement by the latter in a pair of straight parallel paths, and this same supporting structure 76, 78 serves to support a pair of guide bars 92 which are parallel to each other and spaced from each other by a distance approximately equal to the diameter of the cylindrical articles so that only a single row of articles is discharged by the conveyor 84 in the illustrated example. Between the bars 90 and 92 shown as positioned lower than the other bars in FIG. 5, there is a deflecting bar 94 which makes an angle of 150° with the bars 90 and 92, so that this bar 94 will deflect the articles by approximately 30°, in accordance with the present invention. There is also a bar 96 extending between and interconnecting the other bar 92 with the other outer bar 90 as shown in FIG. 5, but the articles do not engage the bar 96 which, if desired, can be eliminated.

Because in the illustrated example two rows are being combined into one, it is clear that the conveyor 84 must be driven at approximately twice the speed of the conveyor 80 so as to provide a substantially gap-free transportation of the articles on the conveyor 84, and in order to provide for a smooth transition of the articles from the conveyor 80 to the conveyor 84 as these articles move through the zone 98 where the number of rows is changed, additional conveyors 100 and 102 are provided. The conveyor 100 is carried by pulleys 104 and 106 carried in turn by suitable shafts, and the shaft which carries the pulley 106 is driven by a transmission 108 which is in the form of a belt and pulleys or chain and sprocket wheels driven through a suitable transmission either from its own source of power or from a common source of power in such a way that the speed of movement of the conveyor 100 is greater than that of the conveyor 80 but less than that of the conveyor 84.

Between the conveyor 100 and the conveyor 84, the conveyor 102 is guided for turning movement on a pulley carried by the same shaft as that which carries the pulley 104, and this latter pulley is freely turnable on this shaft which serves only to support the pulley of the conveyor 102 for rotation but otherwise has no influence on this pulley, and at its right end, as viewed in FIGS. 5 and 6, the conveyor 102 is guided on a pulley 110 which is fixed to a shaft which is driven from a transmission 112 which serves to drive the belt or conveyor 102 either from an independent source or from a transmission connected to a common source of energy, and the arrangement is such that the conveyor 102 advances the articles at a speed greater than that with which they are advanced by the conveyor 100 but less than that with which they are advanced by the conveyor 84. In this way there will be a gradual increase in the speed of the articles as they are advanced through the zone 98, where the number of rows is changed, from the infeed conveyor means 80 to the discharge conveyor means 84.

In the case where the number of rows is decreased from two rows to one row, assuming that the infeed velocity is of a given value, then the conveyor 100 can increase this value by one-third while the conveyor 102 can increase the value by one-half, so that it is through such increments that the speed is increased until the articles reach the conveyor 84 which has a speed approximately twice that of the conveyor 80. Actually, the speed of the conveyor 84 can be slightly greater than twice that of the conveyor 80 to provide a gap-free transportation of the article.

In the case of the reducing three rows to one row or four rows to one row the velocities would progressively increase until the final velocity of the discharge conveyor means would be 3.08 times that of the infeed conveyor means and 4.10 times that of the infeed conveyor means, respectively, while in the case of a decrease from two rows to one row the velocity of the discharge conveyor means is 2.05 times that of the infeed conveyor means.

While a specific embodiment of the invention has been shown and described in detail to illustrate the application of the principles of the invention, it will be understood that the invention may be embodied otherwise without departing from such principles.

What is claimed is:

1. Apparatus for transporting cylindrical articles comprising infeed conveyor means for conveying cylindrical articles to a predetermined row-decreasing zone, laterally offset discharge conveyor means for conveying cylindrical articles away from said row-decreasing zone, plural infeed guides located over and extending longitudinally of said infeed conveyor means for guiding cylindrical articles in a plurality of straight rows in side-by-side relation longitudinally of said infeed conveyor means while they are transported thereby to said row-decreasing zone, discharge guides located over said discharge conveyor means for guiding the cylindrical articles in at least one row extending longitudinally of said discharge conveyor means, said discharge guides being laterally offset from said infeed guides, deflecting means at said row-decreasing zone including transfer guides, one of which is at an angle of approximately 30 degrees to said plurality of straight rows for deflecting articles from said infeed guide means to said discharge guide means while changing the direction of movement of the articles by approximately 30 degrees and intermediate conveyor means situated between said infeed and discharge conveyor means and extending along said row-decreasing zone for gradually increasing the speed of movement of the articles as they are deflected from said infeed conveyor means to said discharge conveyor means.

2. Apparatus as recited in claim 1 and wherein said intermediate conveyor means includes at least one conveyor having a speed greater than that of said infeed conveyor means but less than that of said discharge conveyor means.

3. Apparatus as recited in claim 1 and wherein said intermediate conveyor means includes a first conveyor situated adjacent said infeed conveyor means between the latter and said discharge conveyor means and a second conveyor situated adjacent said discharge conveyor means between the latter and said first conveyor, said first conveyor having a speed greater than that of said infeed conveyor means but less than that of said second conveyor and said second conveyor having a speed greater than that of said first conveyor but less than that of said discharge conveyor means.

References Cited by the Examiner

UNITED STATES PATENTS

| 2,315,880 | 4/1943 | Stiles | 198—32 |
| 2,763,359 | 9/1956 | Rose | 198—30 |
| 2,936,060 | 5/1960 | Carter | 198—32 X |
| 3,107,774 | 10/1963 | Bergeron | 198—32 |
| 3,162,291 | 12/1964 | Bell | 198—32 X |

FOREIGN PATENTS

| 668,956 | 8/1963 | Canada. |

EVON C. BLUNK, *Primary Examiner.*

EDWARD A. SROKA, *Examiner.*